United States Patent [19]

Yaguchi

[11] 4,007,077
[45] Feb. 8, 1977

[54] LIQUID CRYSTAL CELLS

[75] Inventor: Masachika Yaguchi, Yokohama, Japan

[73] Assignee: Dai Nippon Toryo Kabushiki Kaisha, Japan

[22] Filed: Aug. 21, 1975

[21] Appl. No.: 606,493

Related U.S. Application Data

[63] Continuation of Ser. No. 428,839, Dec. 27, 1973, abandoned.

[52] U.S. Cl. .................................. 156/145; 53/43;
156/107; 156/278; 156/325; 156/331;
260/78.41; 350/160 LC; 428/1; 526/312;
526/319
[51] Int. Cl.² ........................................ B32B 31/00
[58] Field of Search ............ 156/100, 106, 107, 94,
156/242, 246, 145, 278, 325, 331, 334;
260/78.4 N, 78.5 N, 86.1 N, 94.2 R; 350/160
LC; 53/43; 106/33, 162; 136/145; 428/1

[56] References Cited

UNITED STATES PATENTS

| | | | |
|---|---|---|---|
| 3,282,773 | 11/1966 | Wicker et al. | 156/310 |
| 3,529,036 | 9/1970 | Edwards | 260/836 |
| 3,577,394 | 5/1971 | Harrington | 260/78.4 |
| 3,751,137 | 8/1973 | Fitzgibbons et al. | 350/160 LC |
| 3,772,210 | 11/1973 | Lodilina | 252/408 |
| 3,807,127 | 4/1974 | Stern | 53/43 |

*Primary Examiner*—Edward G. Whitby
*Attorney, Agent, or Firm*—McGlew and Tuttle

[57] ABSTRACT

A liquid crystal cell consisting of two planar supports and a spacer interposed between them only on the margin, said supports being fixed at intervals of a limit by the spacer to form an aperture, has at least one opening through which the liquid crystal material is poured into said aperture. The openings are sealed with use of cyanoacrylates or polybutadiene type resins so that the liquid crystal cell can be prevented from lowering of the characteristics caused by incorporating of impurities into the liquid crystal layer.

8 Claims, 1 Drawing Figure

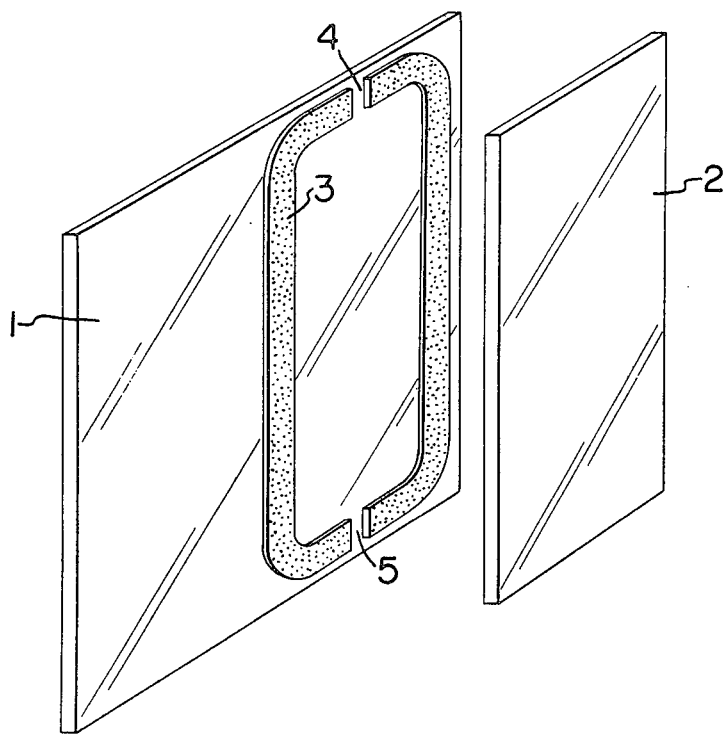

LIQUID CRYSTAL CELLS

This is a continuation of application Ser. No. 428,839, filed Dec. 27, 1973, now abandoned.

BACKGROUND OF THE INVENTION

This invention relates to improved liquid crystal cells and particularly, to a process for sealing the liquid crystal cell after pouring of a liquid crystal material.

The liquid crystal material changes its optical properties in response to an applied electric field, magnetic field or heat. Employing these phenomena, the liquid crystal material are used in the form of a thin layer cell for display of numerical figures, characters and other symbols or patterns, detection of beams, modulation of optical systems, observation of mode patterns, non destructive inspection, and light valves for diaphram of cameras and contrast modulation of cameras, and materials for decoration.

The liquid crystal cell includes two planar supports with a thin liquid crystal layer between them, said supports being fixed at intervals of a limit by a spacer. The supports are usually of glass plate and coated with conducting layers for application of an electric field, resistor layers for heat impressing, radiation heat convertible material layers and light absorptive or reflective layers. The spacer provided between two planar supports only on the margin secures them at intervals of a limit with use of one having adhesive property in itself or an adhesive to form a cell structure having an aperture. The cell has at least one opening through which the liquid crystal material is poured into the aperture. The openings are sealed with adhesives. For this purpose epoxy-type adhesives which are of two-part is used in general. However, when the epoxy-type adhesive of which the cure reaction is too rapid is used, it is difficult to obtain liquid crystal cells having quality uniformly controlled because the assembly of the liquid crystal cell is restricted by time. For this reason, the epoxy-type adhesive having a moderate cure reaction is normally used, but it takes considerable time to completely cure the resin. During the cure reaction, curing agents such as amino compounds or polyamides are incorporated or effused into the liquid crystal layer and therefore, reduction of the mesomorphic range, increase of the current density and reduction of the life occur to the liquid crystal element so that the cells having uniform quality can not be obtained. Further, the curing agent must be added in an exact amount, otherwise the three-dimensional cure reaction does not sufficiently proceed so that sealing effects cannot be obtained with certainty and thus, the sealed parts are reduced in mechanical properties and liable to be peeled off. Moreover, since it is necessary to fix the assembled element during drying of the adhesive, operation efficiency is reduced.

SUMMARY OF THE INVENTION

An object of this invention is, therefore, to provide a finishing seal process for the liquid crystal cell rendering a sufficient seal strength without incorporating of impurities into the liquid crystal layer.

Another object of this invention is to provide liquid crystal cells without reduction of the life, lowering of the mesomorphic range and increase of the current density.

The foregoing are attained by pouring the liquid crystal material through the opening into the liquid crystal cell and sealing all the openings with cyanoacrylates or a polybutadiene type resin of about 200–20,000 in molecular weight exhibiting liquid or fluidity at normal temperature or elevated temperatures thereby to form instantaneously a cured film on the boundary between the liquid crystal layer and the sealed layer.

BRIEF DESCRIPTION OF THE DRAWING

The attached drawing is an exploded schematic view of a liquid crystal cell consisting of two planar supports fixed at intervals of a limit by a spacer.

DETAILED DESCRIPTION OF THE INVENTION

The pouring method of the liquid crystal material into the cell is illustrated referring to the drawing. Spacer 3 provided between two planar supports 1 and 2 on the margin fixes them at intervals of a limit with use of one having adhesive property in itself or an adhesive. The liquid crystal material is effectively poured by immersing the cell upwards opening 5 in the liquid crystal material bath and sucking the inside air from opening 4. Alternatively, the liquid crystal material may be poured by maintaining the cell of which the opening 4 was substantially blocked with spacer 3 in a closed tank, exhausting the tank till the cell becomes vacuous, immersing the cell upwards opening 5 in the liquid crystal material bath and restoring the tank to normal pressure. After pouring of the liquid crystal material openings 4 and 5 are sealed with the adhesive.

We have found cyanoacrylates or polybutadiene type resins to be most suitable for a sealing agent satisfying the two properties to follow:

i. Being liquid or readily convertible to liquid at normal state and having a good applicability and permeability to parts to be sealed, and ii. Curing instantaneously after application and rendering sufficient seal strength without incorporating or effusing of impurities into the liquid crystal layer. Cyanoacrylates which may be used are represented by the formula,

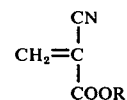

wherein R is a hydrocarbon radical, preferably an aliphatic hydrocarbon radical such as methyl, ethyl, n-propyl, isopropyl, n-butyl, iso-butyl and iso-amyl.

When applied to a part to be sealed, the cyanoacrylate is subject to an instantaneous anionic polymerization and cured due to the OH ions of a trace of water present in the liquid crystal material or water adsorbed on the faces of the cell supports whereby a solvent-insoluble film on the boundary between the sealed layer and the liquid crystal layer is formed so that incorporating or effusing of impurities into the liquid crystal layer can be inhibited. Moreover, the applied cyanoacrylate is immediately cured owing to water in the air and/or water adsorbed on the faces of the cell supports whereby a seal having sufficient strength can be formed.

Although the formation of the insoluble boundary film is sufficient with a trace of water present in the liquid crystal material as mentioned above, the curing of cyanoacrylates may be facilitated by using liquid crystal compounds having a specified functional radical, for example, radicals —CH=N—, —CN, —N=N—,

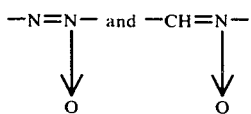

in the molecular. These liquid crystal compounds form solids instantaneously on coming into contact with cyanoacrylates so that the formation of the boundary film can be extremely facilitated.

These liquid crystal compounds may be represented by the formula,

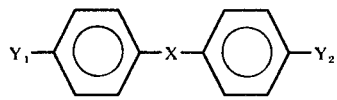

wherein X is —CH = N—, —N=N—,

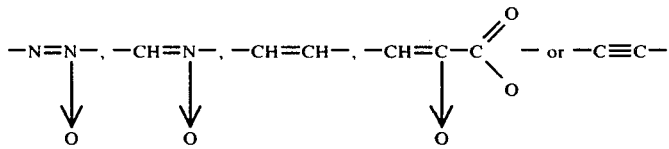

radicals, $Y_1$ and $Y_2$ each is halogen such as chlorine and bromine or —R, —OR, —COR, —CN, —OCOOR or —OCOR radicals wherein R is hydrogen or hydrocarbon radicals. Examples of these compounds include methoxybenzylidene-butylaniline, and p-methoxy, p'-butylazoxy benzene.

Also, liquid crystal compounds synthesized from the starting amines, nitro compounds or hydroxyl group containing compounds can facilitate the cure of cyanoacrylates because they include a very small amount of an unreacted amines, nitro compound or hydroxyl group even after purification. These compounds are, for example, p-methoxybenzylidene, p'-butylaniline, p-methoxy-p'-butylazoxybenzene, and anisylidene-p-aminophenyl acetate.

Moreover, in case of using liquid crystal compounds which were not synthesized from the starting amines, nitro compounds or hydroxyl group containing compounds, the cure of cyanoacrylates can be promoted by adding to the liquid crystal compounds the amines, nitro compounds or hydroxyl group containing compounds in an amount of less than about $10^4$ ppm. Herein, the amines mean an aliphatic amine such as methyl amine and butyl amine, and an aromatic primary amine such as aniline and p-methylaniline. The nitro compounds mean an aliphatic nitro compound such as nitromethane and nitroethane, and an aromatic nitro compound such as nitrobenzene and methylnitrobenzene. The hydroxyl group containing compounds mean an aliphatic alcohol such as methylalcohol and ethylalcohol and an aromatic alcohol such as benzylalcohol and p-methylbenzylalcohol.

According to the present invention, the formation of the insoluble cured film on the boundary of the liquid crystal layer will prevent the liquid crystal layer from incorporating or effusing of impurities thereto so that the liquid crystal cell can be improved in its characteristics, for example, the mesomorphic range, current density and life. Also, because cyanoacrylates cure immediately after application, there is no need to fix the sealed cell for a long time, and the sealed parts are satisfactory in the mechanical strength.

Alternatively, polybutadiene type resins having a molecular weight of about 200 to 20,000 can be used for the sealing agent. The polybutadiene type resins which may be used are a homopolymer of butadiene or a copolymer of butadiene containing at least 30% of butadiene segments in the molecule. Preferably, the copolymer is one containing at least 50% of 1,2-addition butadiene segments in the molecule. A monomer copolymerizable with butadiene is vinyl compounds, such as styrene, acrylonitrile, acrylic esters, maleic anhydride, vinyl chloride and vinyl acetate. These resins which are liquid or become fluidic at normal temperature or elevated temperatures are readily applied into a part to be sealed. When the resin is heated to temperatures above 130° C for fluidizing it, the cure reaction of the resin violently proceeds so that the resin can no longer be used for the sealing agent, particularly, in sealing a numerous liquid crystal cells. For this reason, it is recommended that the resin is liquid or becomes fluidic at temperatures of from normal temperature to about 130° C, preferably to about 100° C, most preferably to about 80° C. A cure reaction rate of the resin is as little as negligible at temperatures below 80° C. On the other hand, since a polybutadiene type resin having a degree of polymerization too low is compatible with the liquid crystal, the resin effuses into the liquid crystal layer during the period of from application to the openings of the cell to curing and therefore, causes reduction of the characteristics of the liquid crystal element. Accordingly, the resin having a molecular weight of preferably, about 500 to 10,000, most preferably, about 1,000 to 5,000 is recommended. The liquid resin permeates in the openings of the cell immediately after application. On the other hand, when the viscous, fluidic resin is applied to the openings of the cell and then heated to promote the cure, the resin is so reduced in viscosity as to readily permeate in the openings.

The permeated resin must be rapidly cured. For this purpose, adding to the resin suitable curing catalysts or heating the sealed part are preferred. The conventional catalysts for radical polymerization may be used for the curing catalyst. Examples of these catalysts are as follows: organic peroxides such as benzoylperoxide, cumenhydroperoxide, di-t-butylperoxide and t-butylperbenzoic acid; inorganic peroxides such as hydrogen peroxide and potassium persulfate; azo and diazo compounds such as azobisisobutylonitrile and diazoaminoazobenzene; aromatic sulfinic acid; alkyl mercury, alkyl lead; redox initiators, for example, $O_2$-dimethylaniline and p-trimethylsulfone, $O_2$-mercaptane and halides, $O_2$ - $\alpha$ - aminothioether and halides, or benzoylperoxide and N-N- dimethylaniline or tri-n-butylamine or ferrous sulphate; ones having initiating property for radical polymerization in combination of two components which have no initiating property alone, for example, copper or iron powders and benzoyl chloride, metal carbonyls and halides, or carbon tetrachloride and Raney nickel.

Oxides and hydroxides of cobalt, manganese, lead and zinc or inorganic salts, or organic salts such as salts of oleic acid, linolic acid, linolenic acid, resin acid and naphthenic acid, or mixtures thereof which are normally used as a drier for coatings may be also used for the cure promotors.

The catalyst and drier are sufficient with a small amount, though the range of 0.1 to 4% by weight of the resin is preferred. A temperature for promoting the cure of the resin is within the range of preferably, about 130° C to 400° C in the presence of the catalyst, and the range of preferably, about 200° C to 400° C in the absence of the catalyst. When curing is effected at temperatures above 500° C, it causes reduction of the characteristics of the liquid crystal element because of decomposition of the resin. Heating may be effected by means of an iron, burners, electric furnaces, infrared rays, supersonic waves, ultraviolet rays, microwaves and electron rays.

As mentioned above, the polybutadiene type resins can be readily applied to the part to be sealed and then cured in several seconds or several tens seconds. These resins contain little impurities of effusing into the liquid crystal layer and therefore, have good processing and exhibit no reduction of the characteristics of the liquid crystal element. Moreover, the sealed parts have sufficient mechanical strength.

The invention is illustrated by the following non-limitative examples.

EXAMPLE 1

A liquid crystal cell as shown in the attached drawing which had been maintained at 80° C was immersed in a liquid crystal bath upwards opening 5. A mixture of 50% of methoxybenzylidenebutylaniline and 50% of ethoxybenzylidene-p'-butylaniline was used as the liquid crystal material. Opening 4 was sucked up to an inner pressure of 10 mmHg. When the liquid crystal material filled the cell in its aperture and overflowed opening 4, the suction was ceased. Thereafter, the cell was withdrawn from the liquid crystal bath and an excess of the liquid crystal material was removed from both sides of the cell. Next, openings 4 and 5 were sealed with cyanoacrylate (sold as cyano-bond RP by Taoka Chemical Co., Ltd., Japan). The cyanoacrylate was cured instantaneously and an insoluble film was formed.

EXAMPLE 2 p-butoxy-p'-n-hexyl-α-chlorostilbene containing $0.25 \times 10^4$ ppm of aniline was used as a liquid crystal material. The cell was filled with the liquid crystal material and sealed with the cyanoacrylate in the same procedure as in Example 1. An insoluble boundary film was formed instantaneously and a perfectly sealed cell was obtained. Reduction of the mesomorphic range, increase of the current density and reduction of the life were not almost observed.

EXAMPLE 3

A liquid crystal cell as shown in the attached drawing which had been maintained at 80° C was immersed in a liquid crystal bath upwards opening 5. The liquid crystal material used was a mixture of 50% of methoxybenzylidenebutylaniline and 50% of ethoxybenzylidene-p'-butylaniline. Opening 4 was sucked up to an inner pressure of 10 mmHg. When the liquid crystal material filled the cell in its aperture and overflowed opening 4, the suction was ceased. Thereafter, the cell was withdrawn from the liquid crystal bath and an excess of the liquid crystal material was removed from both sides of the cell. Next, 1,2-polybutadiene with a molecular weight of 2,000 convertible to fluidity at 60° C (sold as Nisso-PB-TE-2000 by Nihon Soda Co., Ltd., Japan) containing 2% by weight of t-butylperbenzoate was warmed and applied to openings 4 and 5, and heated to about 140° C by an iron for about 10 seconds. The openings were then sealed sufficiently.

EXAMPLE 4

1,4-cis-polybutadiene with a molecular weight of 1,000 convertible to fluidity at 50° C (sold as Polyoil Hills 130 by Hills Co., Germany) containing 0.7% by weight of lead octenate was applied to the openings of the cell which was filled with the liquid crystal material in the same procedure as in Example 3. When the applied parts were heated to about 150° C by an iron for about 30 seconds, the openings were then sealed sufficiently.

EXAMPLE 5

An equi-weight mixture, convertible to fluidity at 60° C, of 1,2-polybutadiene of Example 3 and 1,4-cis-polybutadiene of Example 4 containing 2% by weight of benzoylperoxide was applied to the openings of the cell which was filled with the liquid crystal material in the same procedure as in Example 3. When the applied parts were heated to about 140° C by an iron for 15 seconds, the openings were then sealed sufficiently.

EXAMPLE 6

1,2-addition copolymer of butadiene-maleic anhydride ( monomer ratio 1:1) with a molecular weight of 1,000 convertible to fluidity at 50° C (sold as NISSO-PB-BF-1000 by Nihon Soda Co., Ltd., Japan) containing 2% by weight of benzoylperoxide was applied to the openings of the cell which was filled with the liquid crystal material in the same procedure as in Example 3. When the applied parts were heated to about 140° C by an iron for about 20 seconds, the openings were then sealed sufficiently.

EXAMPLE 7

The same 1,2-polybutadiene as that of Example 3 except not containing catalysts was applied to the openings of the cell which was filled with the liquid crystal material in the same procedure as in Example 3. When the applied parts were heated to about 350° C by an iron for about 15 seconds, the openings were then sealed sufficiently.

Next, effects of effusion of sealing agents to a liquid crystal layer on the properties of a liquid crystal element were tested. The results are given in Table 1.

Table 1

| Sealing Agent | N-Ipt (° C) *1 (after 18 days) | Current Density (μA/cm²) Application of DC 24 Volts, 25° C |
| --- | --- | --- |
| Nylon 66 | 59.2 | 1.30 |
| Soluble Nylon | 58.2 | 2.0 |
| Butyral Resin | 55.3 | 12.0 |
| Vinyl Acetate-Ethylene Copolymer Resin | 58.5 | 4.5 |
| Nylon 6 | 59.0 | 1.8 |
| Epoxy Resin containing curing agents | 58.0 | 2.9 |
| Araldite (CIBA Ltd.) | 50.3 | 240 |
| Cyanoacrylate (Cyano-bond RP by Taoka Chemical Ltd) | 60.0 | 0.21 |
| 1,4-cis-polybutadiene (Polyoil Hills 130) | 60.3 | 0.7 |
| 1,2-polybutadiene (NISSO-PB-TE-2000) | 60.5 | 0.6 |
| 1,2-addition copolymer of butadiene-maleic anhydride (NISSO-PB-BF-1000) | 60.1 | 0.7 |
| Blank Test | 61.5 | 0.2 |

*1Nematic-isotropic transition temperature: Measured by means of differential thermal tester. Specimens are by uniformly applying 0.5g of a sealing agent to a plate of 5cm in diameter on its bottom, adding 5cc of a liquid crystal material thereto, putting the plate into a desiccator and allowing it to stand for 18 days.

Table 1 shows that the sealing agents according to the present invention do not almost effuse into the liquid crystal layer and therefore, have little influence on the N-Ipt and current density.

Furthermore, the liquid crystal cells obtained in the preceding Examples were tested in respect of the N-Ipt and current density. The results are given in Table 2.

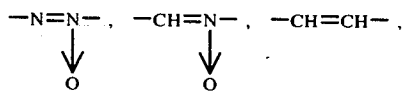

Table 2

| Samples | A *2 N-Ipt(° C) | Current Density (μA/cm²) | B *3 N-Ipt(° C) | Current Density (μA/cm²) | C *4 N-Ipt(° C) | Current Density (μA/cm²) |
| --- | --- | --- | --- | --- | --- | --- |
| Example 1 | 61.5 | 0.2 | 61.3 | 0.4 | 60.8 | 0.9 |
| Example 2 | 61.0 | 0.6 | 60.5 | 0.9 | 60.1 | 1.9 |
| Example 3 | 61.5 | 0.3 | 61.3 | 0.4 | 60.8 | 1.0 |
| Example 4 | 61.4 | 0.4 | 61.3 | 0.5 | 60.1 | 1.4 |
| Example 5 | 61.3 | 0.3 | 61.2 | 0.5 | 60.5 | 1.7 |
| Example 6 | 61.4 | 0.4 | 61.35 | 0.4 | 60.3 | 1.5 |
| Example 7 | 61.5 | 0.3 | 61.3 | 0.4 | 61.0 | 1.0 |

*2: A cell allowed to stand for 30 days after sealing.
*3: A cell subjected twenty times to a cycle test at −20° C for 14 hours and 70° C for 10 hours.
*4: A cell maintained in the atmosphere of saturated steam at 40° C for 300 hours.

It is clear from Table 2 that the liquid crystal cells sealed according to the present invention show little change of the N-Ipt and current density.

What is claimed is:

1. Process for sealing a liquid crystal cell having two planar supports fixed at limited intervals by a spacer and having at least one opening for pouring into the cell a liquid crystal material which process comprises pouring said liquid crystal material through said opening into the cell and applying at least one cyanoacrylate compound to each said opening thereby forming instantaneously an insoluble cured film on the boundary between the liquid crystal layer and the sealed layer, said liquid crystal material consisting essentially of at least one compound having the formula:

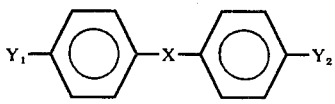

wherein X represents —CH=N—, —N=N—,

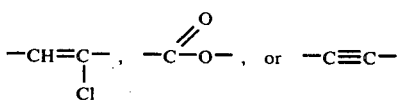

radicals, and $Y_1$ and $Y_2$ each independently represents halogen or —R, —OR, —COR, —CN, —OCOOR or —OCOR radicals wherein R is hydrogen or a hydrocarbon radical having from 1 to 4 carbon atoms, and said cyanoacrylate compound having the formula:

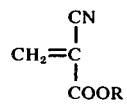

wherein R is a hydrocarbon radical having 1 to 5 carbons atoms, whereby an insoluble cured film seal is formed between the seal layer and the liquid crystal layer so that incorporation or effusion of impurities into the liquid crystal layer is prevented and the liquid crystal cell so formed has improved mesomorphic range, current density and life.

2. Process according to claim 1, wherein said liquid crystal material is at least one compound synthesized from aliphatic or primary aromatic amines, aliphatic or aromatic nitro compounds or aliphatic or aromatic hydroxyl group containing compounds.

3. Process according to claim 2, wherein said liquid crystal material consists essentially of a liquid crystal composition containing at least one of said amines, nitro compounds and hydroxyl group containing compounds in an amount of less than about $10^4$ ppm.

4. Process for sealing a liquid crystal cell having two planar supports fixed at limited intervals by a spacer and having at least one opening for pouring a liquid crystal material into the cell, which process comprises pouring said liquid crystal material through said opening into the cell, sealing all the openings with a polybutadiene type resin of about 200 to 20,000 molecular weight exhibiting liquidity or fluidity at temperatures of from normal temperature to about 130° C, and heating and curing the sealed parts at temperatures of about 130° to 500° C, said liquid crystal material consisting essentially of at least one compound having the formula:

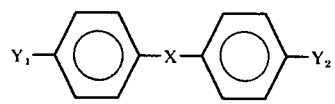

wherein X represents —CH=N—, —N=N—,

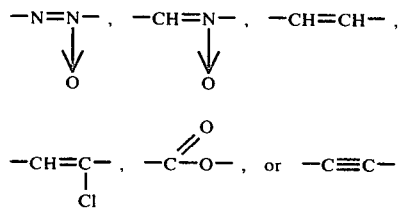

radicals, and $Y_1$ and $Y_2$ each independently represents halogen or —R, —OR, —COR, —CN, —OCOOR or —OCOR radicals wherein R is hydrogen or a hydrocarbon radical having from 1 to 4 carbon atoms, whereby an insoluble cured film seal is formed between the seal layer and the liquid crystal layer so that incorporation or effusion of impurities into the liquid crystal layer is prevented and the liquid crystal cell so formed has improved mesomorphic range, current density and life.

5. Process according to claim 4, wherein said polybutadiene type resin is in the form of a composition containing from about 0.1 to about 4.0% by weight of an initiator for radical polymerization and/or a dryer.

6. Process for sealing a liquid crystal cell having two planar supports fixed at limited intervals by a spacer and having at least one opening for pouring into the cell a liquid crystal material which process comprises pouring said liquid crystal material through said opening into the cell and applying a sealing material to all the openings, said liquid crystal material consisting essentially of at least one compound having the formula:

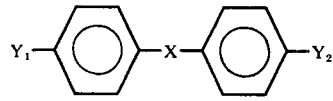

wherein X represents —CH=N—, —N=N—,

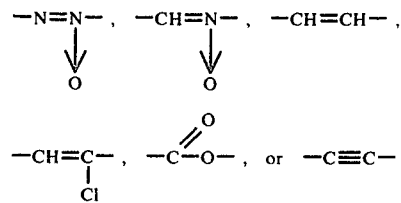

radicals, and $Y_1$ and $Y_2$ each independently represents halogen or —R, —OR, —COR, —CN, —OCOOR or —OCOR radicals wherein R is hydrogen or a hydrocarbon radical, provided that X is —CH=N—, —N=N—,

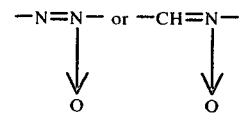

radicals when both of $Y_1$ and $Y_2$ are other radicals than —CN radical and at least one of $Y_1$ and $Y_2$ is —CN radical when X is other radicals then —CH=N—,

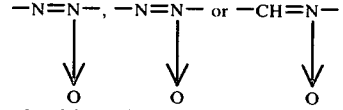

radicals, and said sealing material being a cyanoacrylate compound of the formula:

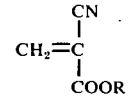

wherein R is a hydrocarbon radical having 1 to 5 carbon atoms, thereby forming instantaneously an insoluble cured film on the boundary between the liquid crystal layer and the sealed layer.

7. Process according to claim 6, wherein said liquid crystal material is compounds synthesized from aliphatic or primary aromatic amines, aliphatic or aromatic nitro compounds or aliphatic or aromatic hydroxyl group containing compounds.

8. Process for sealing a liquid crystal cell having two planar supports fixed at limited intervals by a spacer and having at least one opening for pouring into a cell a liquid crystal material which process comprises pouring said liquid crystal material through said opening into the cell and applying a sealing material to all the openings wherein said liquid crystal material consists essentially of a liquid crystal composition containing at least one of aliphatic or primary aromatic amines, aliphatic or aromatic nitro compounds or aliphatic or aromatic hydroxyl group containing compounds in an amount of less than about $10^4$ ppm and said sealing material is a cyanoacrylate compound of the formula:

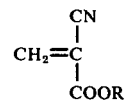

wherein R is a hydrocarbon radical having 1 to 5 carbon atoms, thereby forming instantaneously an insoluble cured film on the boundary between the liquid crystal layer and the sealed layer.

* * * * *